Aug. 20, 1957 K. N. WULFSBERG 2,803,815

DIGITAL TO ANALOG CONVERTER

Filed May 8, 1956

INVENTOR.
KARL N. WULFSBERG
BY Wade Koontz
ATTORNEY and
James S. Shannon
AGENT

United States Patent Office 2,803,815

Patented Aug. 20, 1957

2,803,815

DIGITAL TO ANALOG CONVERTER

Karl N. Wulfsberg, Bedford, Mass., assignor to the United States of America as represented by the Secretary of the Air Force Application May 8, 1956, Serial No. 583,598

3 Claims. (Cl. 340—347)

(Granted under Title 35, U. S. Code (1952), sec. 266)

The invention described herein may be manufactured and used by or for the United States Government for governmental purposes without payment to me of any royalty thereon.

It is the object of this invention to provide means for producing an analog of a digital quantity, particularly a binary number. Briefly, this is accomplished by producing a plurality of currents proportional to the values of the "1" digits of the binary number. The sum of these currents is the analog of the number.

Figure 1:
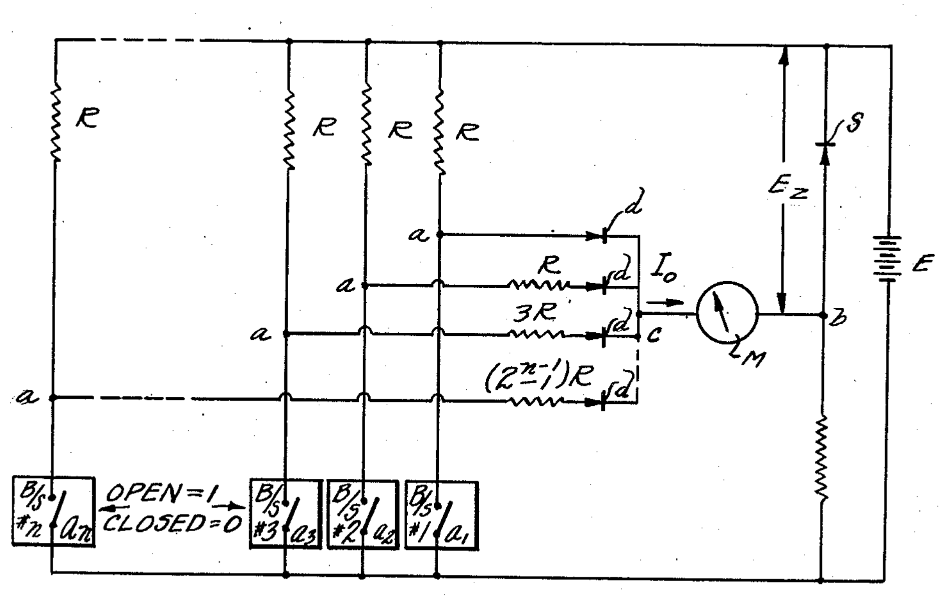
Figure 1A:
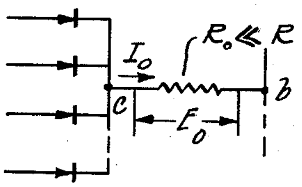

A more detailed description of the invention will be given in connection with the specific embodiment thereof shown in the accompanying drawing, in which Fig. 1 is a schematic diagram of the converter, and Fig. 1*a* is a modification of Fig. 1.

Referring to Fig. 1, bistable element B/S #1 represents the most significant digit of the binary number, B/S #2 the 2nd most significant digit, B/S #3 the 3rd most significant digit and so on to B/S #*n* which represents the least significant digit. Each of these bistable elements is connected in series with a resistance R across voltage source E. In its simplest form the bistable element may be a switch as shown, the open condition of the switch representing the binary digit "1" and the closed condition representing the binary digit "0." In general the bistable element is a device having two conditions of stability in one of which, representing the digit "1," an open circuit is represented and in the other of which, representing the digit "0," the device is sufficiently conductive that the voltage drop across R exceeds $E_z$, or, stated in another way, that the voltage at point *a* is below that at point *b* so that diode *d* is nonconductive. Any device satisfying these conditions may be used, such as a vacuum tube, transistor, etc.

Connected between points *a* and *c* are a plurality of branch circuits each containing a collector diode *d* and, with the exception of the branch circuit associated with the B/S #1, a series resistor. These branch circuits together with the resistances R associated with the bistable elements form a plurality of circuits connected in parallel across the voltage $E_z$. The total resistances in these circuits have values corresponding to the values of the binary number places. Thus the circuit nearest $E_z$ has a total resistance R, the next circuit a total resistance 2R, the third a total resistance 4R and the $n^{th}$ a total resistance $2^{n-1}$R. The current $I_0$ is the sum of all the currents produced in these parallel circuits by voltage $E_z$. Its value, indicated by current meter M, is $$I_0=a_1(E_z/R)+a_2(E_z/2R)a_3(E_z/4R)+\dots a_n(E_z/2^{n-1}R)$$

where the coefficients $a_1, a_2, a_3 \dots a_n$ are either 1 or 0 depending upon the conditions of bistable elements B/S #1 . . . B/S #*n*, respectively, which in turn depend upon the binary number to be converted.

As already stated, the binary coefficient 1 is represented by an open circuit condition in the corresponding bistable element. For example, if the most significant digit of the binary number is 1, B/S #1 is open and the current in the associated parallel circuit is $E_z$/R. On the other hand, if the most significant digit is 0, B/S #1 is sufficiently conductive for point *a* to be at a lower potential than point *b*. Under this condition the associated collector diode *d* is nonconductive thus effectively opening the parallel circuit across $E_z$ and reducing its current to zero. In a similar manner, the remaining parallel circuits either contain currents equal to $E_z$ divided by their total resistances or are open and have zero current depending upon the digits of the binary number. $I_0$ is therefore the analog of the binary number.

If it is desired that the analog be in the form of a voltage rather than a current, a resistor $R_0$ may be substituted for meter M, as shown in Fig. 1*a*. The resistance of $R_0$ should be much less than R for accuracy.

The overall accuracy of the device depends upon the tolerances of the resistors used and the stability of reference voltage $E_z$. In the embodiment shown, a constant voltage $E_z$ is obtained by use of a silicon junction type diode S operated in its Zener characteristic where the voltage across the diode is independent of diode current over a wide range. Other suitable means of maintaining $E_z$ constant may be employed.

I claim:

1. Apparatus for deriving the analog of a binary number comprising: a source of constant direct voltage; a plurality of circuits corresponding to the places of said binary number and connected in parallel to said source, each of said circuits consisting of a resistor and a diode in series, said diodes being poled to conduct under the influence of said constant voltage, the relative values of said resistors being the same as the relative values of the places of said binary number; a bistable means associated with each of said circuits, each bistable means in one of its stable conditions producing no effect on its associated circuit and in the other stable condition increasing the voltage across at least a portion of the resistor in the associated circuit to a value exceeding said constant voltage; and means for adding the currents in said circuits, the resulting total current being the analog of said binary number.

2. Apparatus for deriving the analog of a binary number comprising: a source of direct voltage; means for deriving a constant direct voltage from said source; a plurality of circuits corresponding to the places of said binary number and connected in parallel to said constant direct voltage, each of said circuits consisting of a resistor and a diode in series, said diodes being poled to conduct under the influence of said constant voltage, the relative values of said resistors being the same as the relative values of the places of said binary number; a bistable element associated with each of said circuits, each bistable element in one of its stable conditions producing no effect on its associated circuit and in the other stable condition permitting sufficient current from said source to flow through at least a portion of the resistor in the associated circuit to increase the voltage across said portion to a value exceeding said constant voltage, said one stable condition of said elements representing the binary digit "1" and said other stable condition representing the binary digit "0"; and means for adding the currents in said circuits, the resulting total current being the analog of said binary number.

3. Apparatus as claimed in claim 2 in which means are provided for deriving a voltage proportional to said total current.

References Cited in the file of this patent

UNITED STATES PATENTS

| | | |
|---|---|---|
| 2,685,084 | Lippel | July 27, 1954 |
| 2,718,634 | Hansen | Sept. 20, 1955 |